United States Patent
McCormack

(10) Patent No.: US 10,371,120 B2
(45) Date of Patent: Aug. 6, 2019

(54) WATER TURBINE ASSEMBLY

(71) Applicant: Gkinetic Energy Limited, Newcastle West (IE)

(72) Inventor: Vincent McCormack, Newcastle West (IE)

(73) Assignee: GKINETIC ENERGY LIMITED, Newcastle West (IE)

( * ) Notice: Subject to any disclaimer, the term of this patent is extended or adjusted under 35 U.S.C. 154(b) by 203 days.

(21) Appl. No.: 15/522,560

(22) PCT Filed: Nov. 2, 2015

(86) PCT No.: PCT/EP2015/075457
§ 371 (c)(1),
(2) Date: Apr. 27, 2017

(87) PCT Pub. No.: WO2016/066856
PCT Pub. Date: May 6, 2016

(65) Prior Publication Data
US 2017/0314528 A1    Nov. 2, 2017

(30) Foreign Application Priority Data
Oct. 31, 2014 (GB) .................................. 1419459.1

(51) Int. Cl.
*F03B 13/26* (2006.01)
*F03B 17/06* (2006.01)

(52) U.S. Cl.
CPC .......... *F03B 17/067* (2013.01); *F03B 13/264* (2013.01); *F05B 2220/32* (2013.01); *F05B 2260/506* (2013.01); *F05B 2260/72* (2013.01); *Y02E 10/28* (2013.01)

(58) Field of Classification Search
CPC ...... F03B 3/145; F03B 13/264; F03B 17/065; F03B 17/067; F05B 2260/506; F05B 2260/72; F05B 2260/76
See application file for complete search history.

(56) References Cited

U.S. PATENT DOCUMENTS

| 2,171,732 A | * | 9/1939 | Michaelson | .......... F03B 17/065 |
| | | | | 416/116 |
| 3,382,931 A | | 5/1968 | Dejussieu-Pontcarral et al. | |
| 4,455,491 A | * | 6/1984 | Lanzrath | ................. F03D 3/068 |
| | | | | 290/44 |

(Continued)

FOREIGN PATENT DOCUMENTS

| CN | 202468155 U | 10/2012 |
| DE | 10032674 A1 | 1/2002 |
| WO | WO-02052149 A1 | 7/2002 |

*Primary Examiner* — Ninh H. Nguyen
(74) *Attorney, Agent, or Firm* — Adler Pollock & Sheehan P.C.

(57) ABSTRACT

This invention relates to an improved vertical axis water turbine assembly (2) for generating rotary power from fluid flow, the water turbine assembly (2) having active blade pitch control. The water turbine assembly (2) comprises a plurality of vertical blades (20) disposed about a vertical assembly axis, each vertical blade (20) having a vertical blade axis and being adapted for movement about said vertical blade axis. The water turbine assembly (2) further includes guide means to control the movement of each of the plurality of vertical blades (20) as the water turbine assembly (2) rotates.

20 Claims, 9 Drawing Sheets

(56) References Cited

U.S. PATENT DOCUMENTS 8,197,206 B2 * 6/2012 Sundermann ......... F03B 17/067
 416/147
2012/0139251 A1 6/2012 Pai

* cited by examiner

WATER TURBINE ASSEMBLY

RELATED APPLICATIONS

This application is a national phase filing under 35 U.S.C. 517 371 of international Application No. PCT/EP2015/075457 filed Nov. 2, 2015, which claims priority from Great Britain application number 1419459.1, filed Oct. 31, 2014, the entire contents of each being hereby incorporated by reference herein.

This invention relates to an improved vertical axis water turbine assembly (VAWT) for generating rotary power from fluid flow, the turbine assembly having active blade pitch control.

A distinction is to be drawn between vertical axis water turbine assemblies and vertical axis air turbine assemblies. Assemblies designed for use in air flows are not suitable for water flows. A vertical turbine assembly working in water rotates much slower and must cope with much higher torque loads than one working in air. Active blade pitch control systems in air turbines are not designed to cope with these high torque loads. Typically such control systems are located close to the centre of the turbine axle and use arms with linkage systems to change the blade pitch. The most significant limiting factor of these linkage systems is the amount of blade pivot angle they can provide. Another significant limiting factor is the amount of torque that the control system can apply to the pivot action.

A vertical axis water turbine assembly in accordance with the present invention is intended for mounting in a tidal stream and has particular utility for use with an accelerator in which a turbine driver current is provided having a speed greater than that of the uninterrupted ambient tidal stream. The term "tidal stream" is used in this specification because in many instances such water turbine assemblies are placed in locations subject to tidal variations. However, the terms in this specification "tidal stream" and "current" are to be understood to refer not simply to the flow of water subject to tidal variations but to any moving body of water such as a river, ocean currents and water discharges from structures generally. Further the terms "tidal stream" and "current" are used in this specification interchangeably. Hydroelectric power is one of the most significant if not the most significant reusable energy sources available.

It is well known that, to generate lift, there is an optimal blade angle of attack. When applied to the blades of a VAWT, this optimal angle of attack will generate the maximum rotary power. Optimal angles of attack change for different parameters of flow speed and turbine rotational speed. Also the angle of the blade must be adjusted depending where it is relative to the rotational position of the turbine. Therefore to generate maximum rotational power, the angle of the turbine blade relative to the turbine centre pivot must be constantly adjusted.

A VAWT that operates in water flows must have a significantly different design to a vertical axis turbine that will operate in air. Primarily, this is because of the higher viscosity of water. A vertical axis turbine working in an air flow will typically have rotational speeds of 500 RPM or more. A fixed blade VAWT working in water flow will typically have maximum rotational speeds of 100 RPM. A VAWT in accordance with the present invention with active blade pitch control will be most efficient at rotational speeds of between 10 and 40 RPM.

According to a first aspect of the invention, a vertical axis water turbine assembly for use in a tidal stream, the vertical axis water turbine assembly being adapted for rotation about a vertical axis and comprising a plurality of vertical blades disposed about said assembly axis, each of the vertical blades having a vertical blade axis and being adapted for movement about said vertical blade axis and guide means actively to control the movement of each of the plurality of vertical blades as the water turbine assembly rotates; in which the guide means are adapted in a first region to control the movement of each vertical blade as it passes through an area of the tidal stream in which the vertical blade develops maximum lift; and in which the guide means are also adapted in a second region to control the movement of each vertical blade as it passes through an area of the tidal stream in which the vertical blade develops no lift; and in which the guide means comprises a cam translating the rotational movement of the turbine assembly into pivoting movement of the vertical blade; and in which the cam comprises a first cam follower spaced from the axis of rotation of the vertical blade with the first cam follower being adapted to run in a first continuous track provided in or as part of the upper support and a second cam follower spaced from the axis of rotation of the vertical blade and being adapted to run in a first discontinuous track provided in or as part of the upper support in the first area of the tidal stream and in a second discontinuous track provided in or as part of the upper support in the second area of the tidal stream.

Preferably each vertical blade is controlled to flip about its vertical blade axis through the tidal stream.

Preferably each vertical blade is controlled to provide minimum drag through the tidal stream.

Preferably the water turbine assembly further comprises a lower support, each of the plurality of vertical blades being mounted on the lower support for pivoting motion with respect to the lower support.

Preferably the water turbine assembly further comprises an upper support, the guide means to control the movement of each of the plurality of vertical blades cooperating with the upper support, each of the plurality of vertical blades being mounted for pivoting motion with respect to the upper support.

Preferably the guide means for each vertical blade is mounted to an upper region of the vertical blade.

Preferably in the first region the guide means cause the vertical blade to pivot to develop maximum lift.

Preferably one or more of the plurality of vertical blades is provided with a NACA profile.

Preferably the cam is fixed in relation to said vertical blade axis.

Preferably the first cam follower is spaced a first distance from said vertical blade axis.

Preferably, or alternatively, the second cam follower is spaced a second distance from said vertical blade axis.

Preferably the second cam follower is spaced a second distance from said vertical blade axis. More preferably, the first distance is greater than the second distance. Even more preferably, the first distance is twice the second distance.

Preferably the first cam follower is disposed at 90° to the second cam follower.

Preferably the first cam follower is provided with an upwardly extending protrusion.

Additionally the second cam follower is provided with an upwardly extending protrusion. Preferably the upwardly extending protrusion of the first cam follower extends further upward than the upwardly extending protrusion of the second cam follower.

Preferably the upwardly extending protrusion of the second cam follower extends upwardly parallel to the associated vertical blade.

The invention will now be described, by way of example only, in relation to the attached Figures, in which FIG. 1 shows a schematic view of a vertical axis water turbine assembly and part of an accelerator;

Figure 1:
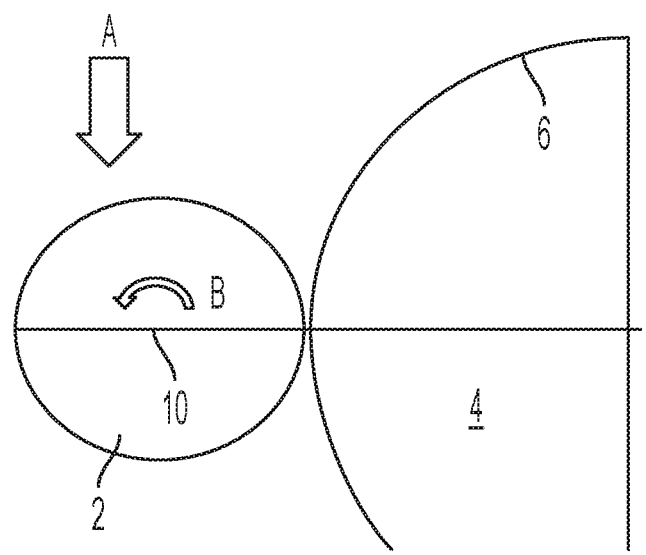

FIG. 1 shows a schematic view of a water turbine assembly 2 located to one side of an accelerator 4. The accelerator 4 provides a turbine driver current having a speed greater than that of the uninterrupted ambient tidal stream. The accelerator 4 has a bluff body with a water flow facing front face or bow 6 and side faces depending therefrom around which the water flows adjacent each of the side faces as the turbine driver current. The general direction of tidal flow is indicated by arrow A. Arrow B indicates the direction of rotation of the water turbine assembly.

This description relates to the port vertical axis water turbine assembly 2 (left hand side of the bluff body as you face the bow 6). It will be understood that the starboard (right hand) arrangement comprises a mirror image arrangement and is not described further. A centre 10 of the coordinate system coincides with the axis of the turbine. The positive Y direction of the coordinate system is parallel to the centreline of the bluff body and exactly opposite to the water flow direction. The positive X direction of the coordinate system points toward the centre of the bluff body. Angles are positive when anticlockwise. 0° is parallel to the positive x-axis. This port turbine assembly rotates in the positive direction (anticlockwise) in this coordinate system.

References to 'upper' or 'lower' or similar directional references are to be understood with reference to the turbine assembly being upright about its vertical axis, unless the context makes clear an alternative reading is required.

The water turbine assembly is preferably mounted within a support. The support can comprise a side pillar from which extend upper and lower turbine supports. A vertical shaft 12 adapted for rotation is mounted between or more preferably through the upper and lower turbine supports.

The water turbine assembly has a vertical assembly axis about which the vertical axis water turbine assembly is adapted to rotate. The vertical shaft 12 is preferably provided co-incident with the vertical axis. The exterior vertical surface(s) of the vertical shaft 12 is conveniently shaped to aid flow of water about the vertical shaft 12.

The water turbine assembly 2 further comprises a plurality of vertical blades 20 disposed about said vertical assembly axis. Conveniently each of the plurality of vertical blades is identical to the others. Each vertical blade 20 has a vertical blade axis and is adapted for movement about said vertical blade axis. Guide means are provided to control the movement of each of the plurality of vertical blades 20 as the vertical axis water turbine assembly 2 rotates. Conveniently, the plurality of vertical blades comprises between 3 and 10 blades. Most preferably the plurality of blades comprises 6 blades.

Each vertical blade 20 incorporates a shaft aligned with the vertical blade axis. The vertical axis water turbine assembly 2 further comprises an upper blade support 28 and a lower blade support. Conveniently the upper blade support 28 and the lower blade support are mounted on the central shaft 12 to rotate about the vertical axis of the turbine assembly. Conveniently the upper and lower blade supports are formed as support plates mounted for rotation about the central shaft 12.

The lower blade support is provided with lower mounting means, for example bearings, for the lower end of each vertical blade shaft. The lower mounting means permits movement of the respective vertical blade 20 about its vertical axis. It will be appreciated that in use this part of the water turbine assembly 2 will be immersed in the tidal stream and that the mounting means, for example bearings, will be selected with this in mind.

The upper blade support 28 is provided with upper mounting means for the upper end 22 of each vertical blade shaft. The upper mounting means permit movement of the respective vertical blade 20 about its vertical axis. In a preferred embodiment, the upper mounting means corresponds to the guide means to control the movement of each of the plurality of vertical blades.

The guide means are described in greater detail by reference to FIGS. 2 to 12.

A cam system is provided to control the pitch of the vertical blades 20 as they rotate.

Figure 2:
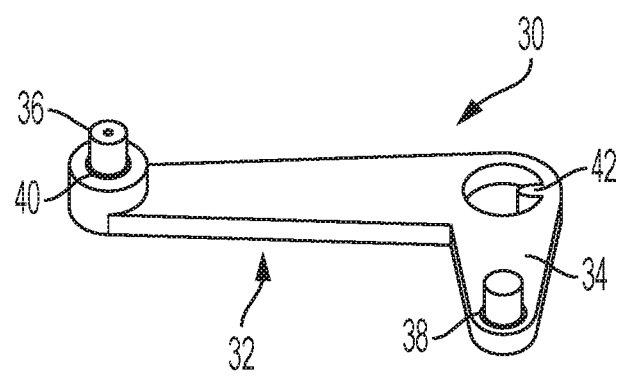
FIG. 2 shows a perspective view of a cam follower for use in the present invention.

A cam follower arm 30 for use in the present invention is shown in FIG. 2. The upper end 22 of each vertical blade shaft is provided with such a cam follower arm 30. The cam follower arm 30 is conveniently substantially L-shaped having a first longer limb 32 connected to a second shorter limb 34. Each cam follower arm 30 is mounted in fixed relation to a respective upper end 22 of each vertical blade shaft. In a preferred embodiment this is achieved by the use of complementary locating features on each of the upper vertical blade shaft and the cam follower arm, for example a notch 42 in the cam follower arm 30 for engaging a complementary recess in the vertical blade shaft.

A free end of the longer cam follower limb 32 is provided with a first upwardly extending protrusion 36. This first upwardly extending protrusion 36 is adapted to be received within the upper support 28.

A free end of the shorter cam follower limb 34 is provided with a second upwardly extending protrusion 38. The function of this second upwardly extending protrusion 38 is described below.

The upper support 28 (FIG. 4) comprises a first continuous track 50 defining a perimeter. The first upwardly extending protrusion 38 is adapted to be received within the first continuous track 50 of the upper support. In the illustrated embodiment of FIG. 4 the first continuous track 50 is supported from a hub 52 by a plurality of spokes 54. Conveniently, the hub 52 and spokes 54 are formed integrally with the continuous track 50. The hub 52 of the upper support 28 is supported at an upper end of the water turbine assembly 2 for rotation about the vertical axis of the water turbine assembly 2.

First and second discontinuous tracks 60, 62 are also provided on or as part of the upper support. Each discontinuous track 60,62 is preferably provided at a leading end with leading, preferably champfered, edges 56 to ease entry of the second protrusion 38 into the discontinuous track.

The first or primary discontinuous track 60 is located outside of the perimeter of the continuous track 50 and is connected to the upper support by further spokes or supports 64.

The second or secondary discontinuous track 62 is located within the perimeter of the continuous track 50 and is mounted on the spokes 54 supporting the first continuous track 50. The secondary discontinuous track 62 is located opposite the primary discontinuous track 60.

Figure 4:
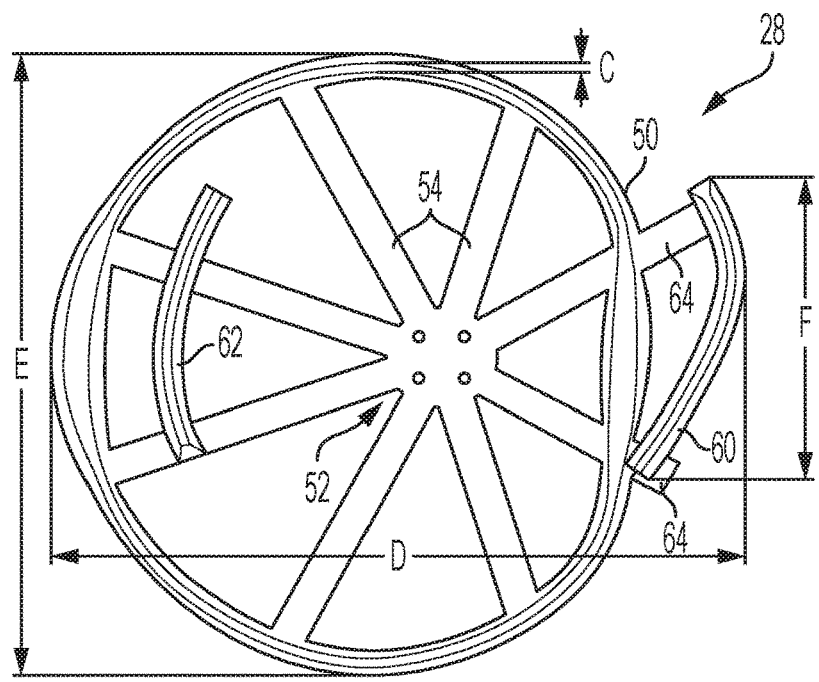
FIG. 4 shows a view from below of an upper support for use with the present invention.
Figure 4A:
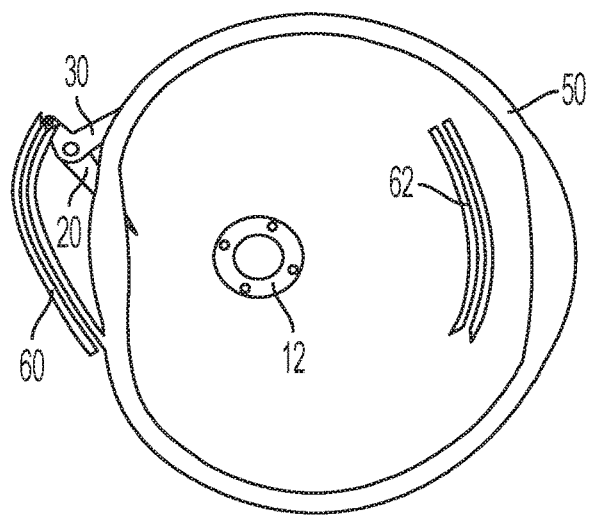
FIG. 4A shows a plan view from above of an alternative embodiment of an upper support for use with the present invention.

In FIG. 4A, where like reference numerals refer to like parts, the first continuous track 50 as well as the first and second discontinuous tracks 60,62 are supported from a fixed support plate (not shown). In a preferred embodiment (not shown), the first continuous track 50 is formed within the fixed support plate and the first and second discontinuous tracks 60,62 are supported from the fixed support plate. An upper end of the central shaft 12 is shown in FIG. 4A.

It will be understood that the central shaft is conveniently connected to any suitable means to harness the rotary power generated by the turbine assembly.

The determination of the shape and relative position of the first continuous track 50 and the first and second discontinuous tracks 60,62 given the illustrated cam follower arm 30 arrangement is described below.

In FIGS. 3 and 5 to 12 it can be seen how the blade is moved as the turbine rotates. Dimensions of the components of the turbine assembly are provided by way of example only.

The cam follower arm 30 measures 100 mm long between its pivot point and the centre of the first upwardly extending protrusion 36.

The cam follower arm 30 measures 50 mm between the pivot point and the centre of the second upwardly extending protrusion 38. It will be understood that this dimension runs parallel to the associated vertical blade 20.

Each of the upwardly extending protrusions 36,38 are 10 mm in diameter and 11 mm in height. This allows space between inner surfaces of the tracks 50,60,62 and the cam follower arm 30. The first upwardly extending protrusion 36 is conveniently provided upon a 10 mm high boss 40 at the base of the cam follower arm 30.

The discontinuous tracks 60,62 are located lower than the main continuous track 50 as the paths traversed by the first and second protrusions 36,38 cross at several points, and is the reason why the first protrusion 36 is raised in comparison to the second protrusion 38.

The centres of the shafts of the vertical blades 20 (that is their pivot axes) are arranged around a circular path 26 having a diameter of 600 mm.

Figure 3:
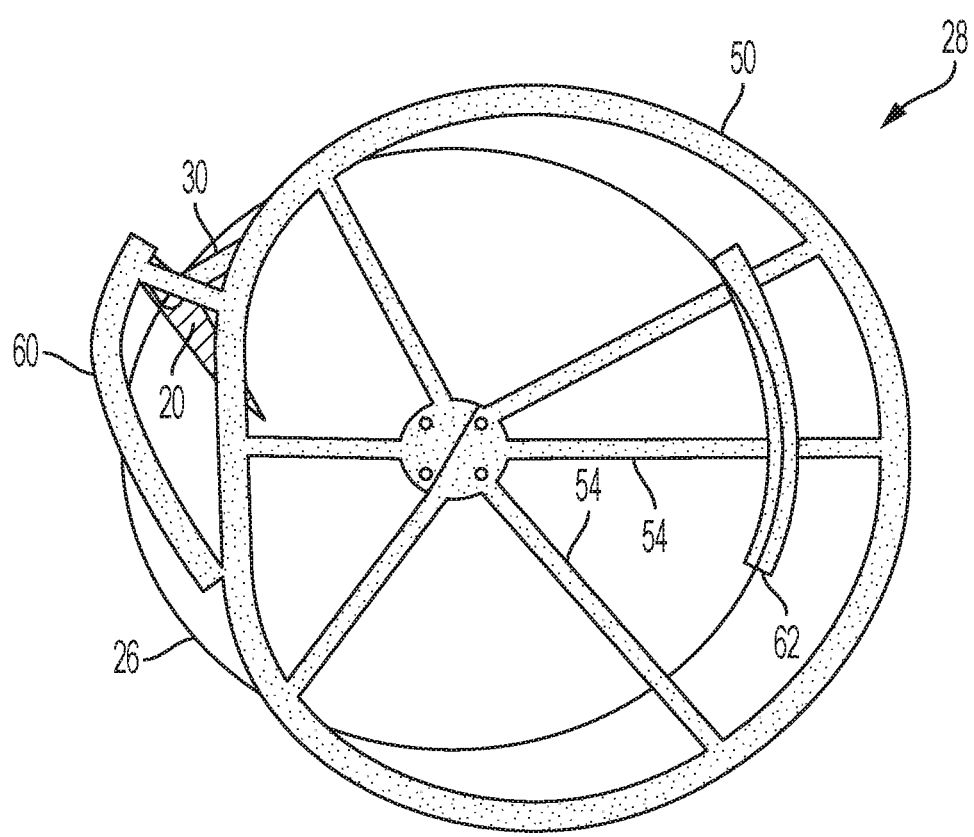
FIG. 3 shows a schematic view from above of a water turbine assembly in accordance with the present invention.

FIG. 3 is somewhat schematic showing by way of illustration a single blade 22 in which the first protrusion 36 of a cam follower arm is located within the continuous track 50. This Figure illustrates the circular path 26 described by each blade 22 in relation to the upper support 28 comprising the continuous path 50 and the discontinuous paths 60,62

The normal width (C—FIG. 4) of the continuous track 50 is 10.2 mm. The upper assembly comprising the continuous and discontinuous tracks 50,60,62 is 757.4 mm at its widest point (D—in line with the discontinuous tracks 60,62 and at its narrowest is 741.56 mm (E—measured normal to the previous measurement). Parallel to this narrow dimension the first discontinuous track 60 is 359.14 mm long (F).

Figure 5:
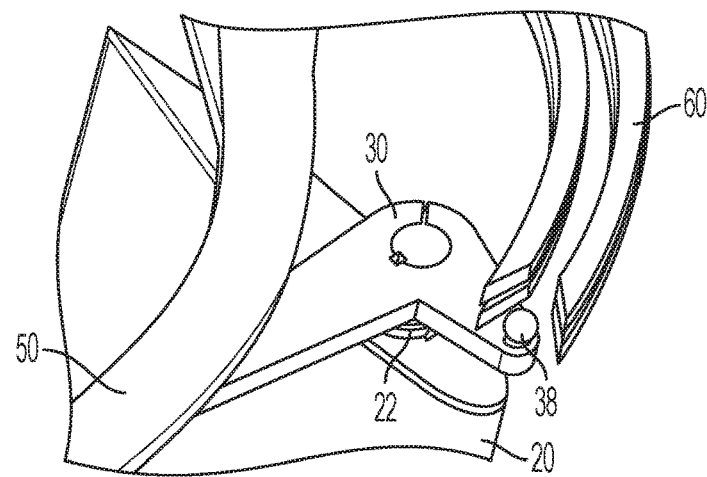
FIG. 5 shows a detail of a water turbine assembly in accordance with the present invention viewed from above with a blade in a first portion.

FIG. 5 is a view of part of the turbine assembly 2 from above, and FIGS. 6 to 12 are views from a perspective below the turbine so that it can be seen how the cam follower arm 30 fits into the tracks and rotates as the turbine assembly 2 rotates. While only a single vertical blade 20 and its cam follower arm 30 are shown it will be understood that the water turbine assembly 2 comprises a plurality of such vertical blades with associated cam follower arms.

In FIG. 5 the first protrusion 36 of a cam follower arm 30 is located within the continuous track 50 (and corresponds to the position of the blade shown in FIG. 3). The cam follower 30 is connected to the upper shaft 22 of the blade 20. The shaft, and more particularly the pivot point, of the vertical blade 20 rotates around the vertical axis of the water turbine assembly 2 to describe the circular path 26.

Figure 6:
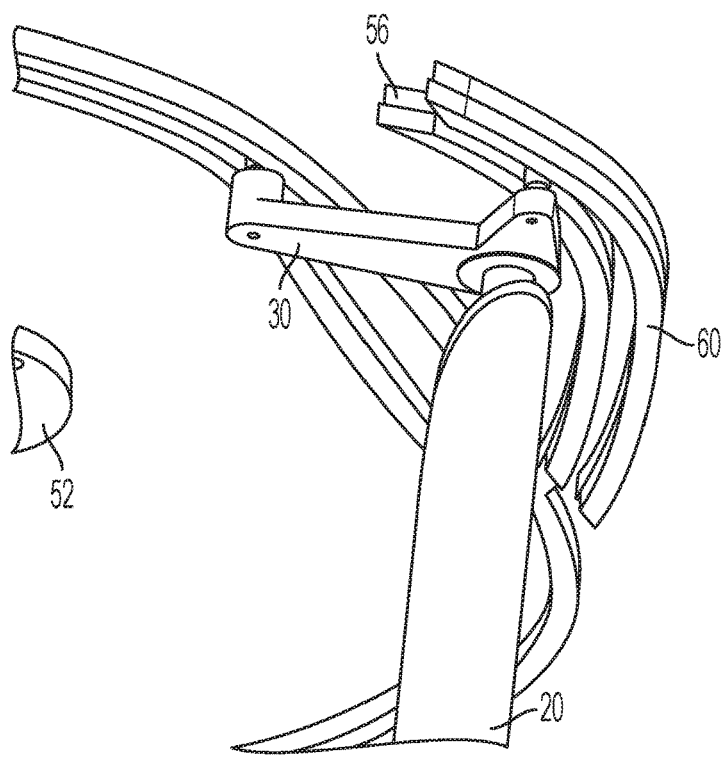
FIG. 6 shows the detail of the water turbine assembly of FIG. 5 viewed from below.
Figure 7:
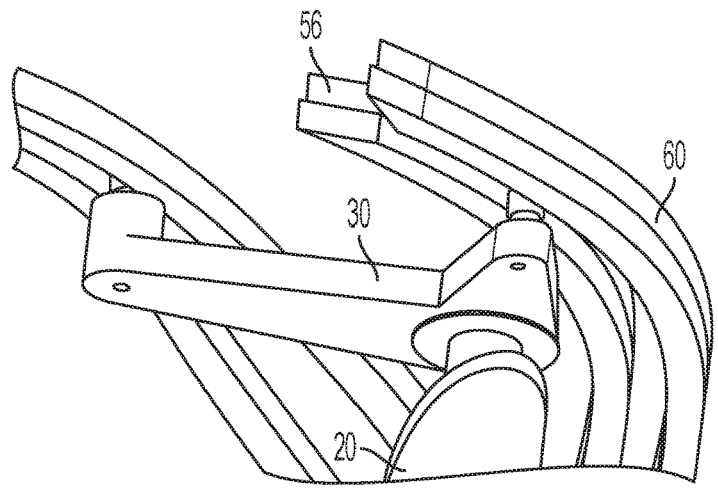
FIG. 7 shows a view similar to that of FIG. 6 with the blade in a second position.

FIG. 6 shows the vertical blade 20 in the same position as in FIG. 5 though viewed from below. The second protrusion 38 of the cam follower arm 30 can be seen to have just entered the primary discontinuous track 60.

As the water turbine assembly 2 rotates the second protrusion 38 is drawn inward and towards the path of the vertical blade 20 (FIG. 7) and across and within the path of the vertical blade (FIG. 8), causing the vertical blade 20 to flip with respect to the tidal stream. The vertical blade 20 has completed the flip motion as the second protrusion 38 exits the primary discontinuous track 60 (FIG. 9).

Figure 8:
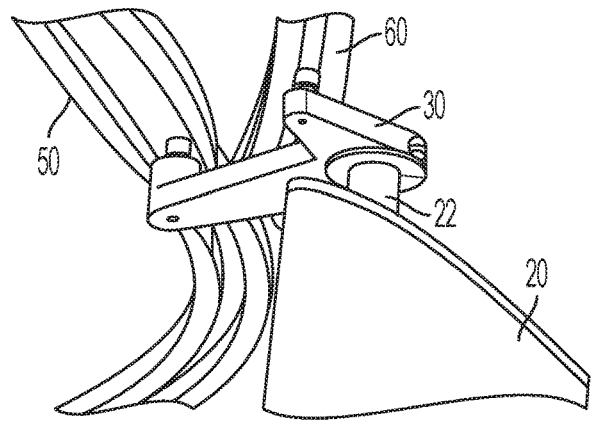
FIG. 8 shows a view similar to that of FIGS. 6 and 7 with the blade in a third position.
Figure 9:
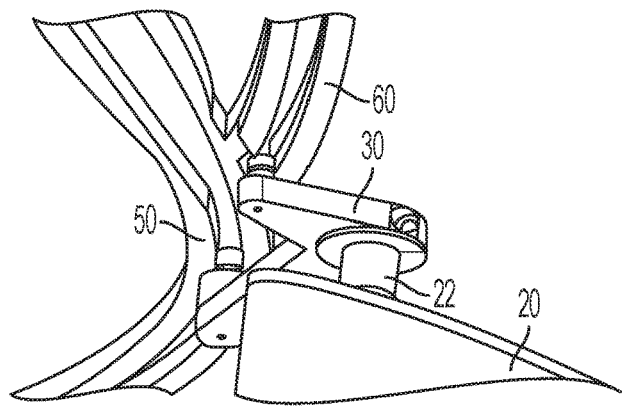
FIG. 9 shows a view similar to that of FIGS. 6, 7 and 8 with the blade in a forth position.

It can be seen in FIGS. 5 to 9 that the continuous track 50 is widened at the point of turn, creating a play for the first protrusion 36 such that the first protrusion 36 can be considered disengaged from (though still guided by) the continuous track 50. FIG. 8 shows the first protrusion 36 re-engaging with the continuous track 50 as the second protrusion 38 is set to exit the first discontinuous track 60.

The interaction of the cam follower arm 30, the primary continuous track 50 and the first discontinuous tracks 60 actively controls the pivot of the vertical blade 20.

As the vertical blade 20 passes through the area in the tidal flow in which the vertical blade 20 develops maximum lift, high loads are exerted on the blade pivot axle or shaft and its associated mounting bearings. The lever power of the cam follower arm 30 is advantageous in dealing with these loads.

It will be understood that the first protrusion 36 may be provided with a rotary cam follower to aid travel of the first protrusion 36 along the continuous track 50. Similarly the second protrusion 38 may also be provided with a rotary cam follower to aid travel of the second protrusion 38 along the discontinuous tracks 60,62.

Figure 10:
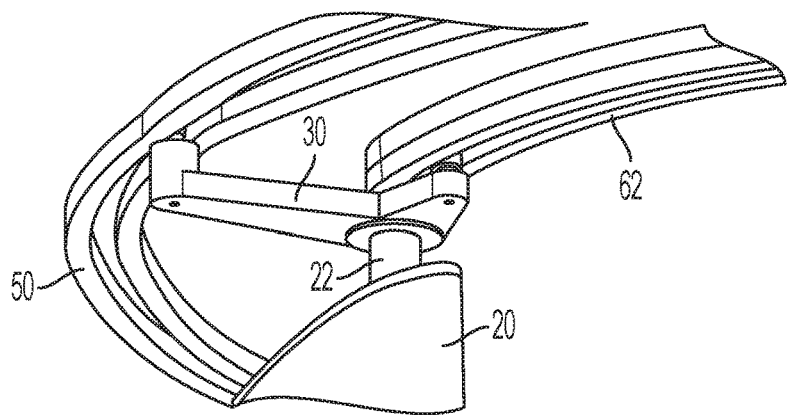
FIG. 10 shows a further detail of a water turbine assembly in accordance with the present invention viewed from above with the blade in a fifth position.

FIG. 9 shows the vertical blade 20 and cam follower arm 30 as the vertical blade 20 passes through the area of quiet water flow where the turbine assembly 2 develops no lift. The second protrusion 38 enters the second discontinuous track 62 at this point. As the vertical blade traverses the path 26 the vertical blade 20 is held in position in relation to the water flow. FIG. 10 shows the vertical blade 20 with the cam follower arm 30 at a midpoint of the second discontinuous track 62 and FIG. 11 shows the vertical blade 20 with the cam follower arm 30 about to exit the second discontinuous track 62.

Figure 11:
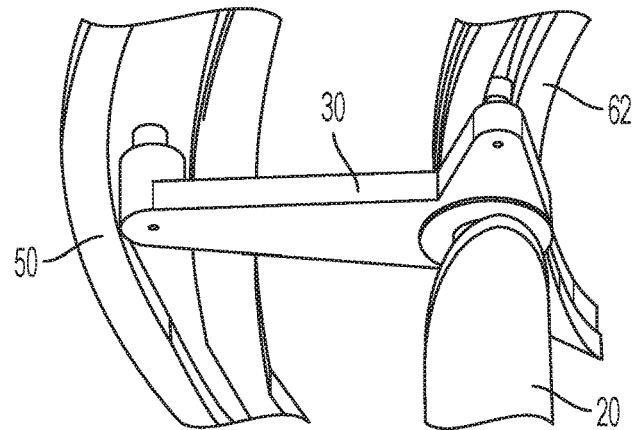
FIG. 11 shows a view similar to that of FIG. 10 with the blade in a six position.
Figure 12:
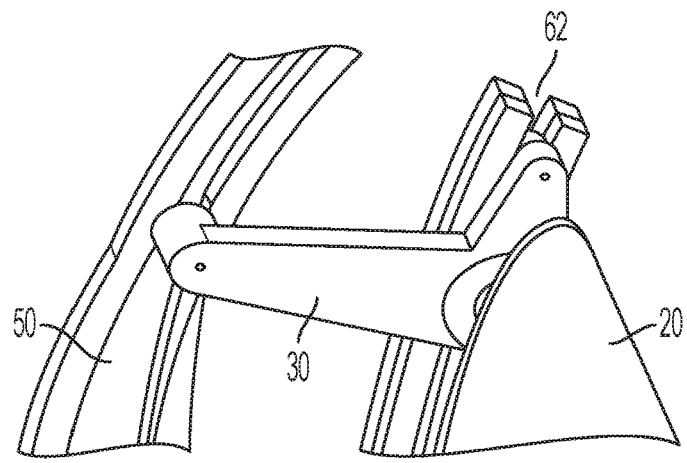
FIG. 12 shows a view similar to that of FIGS. 10 and 11 with the blade in a seventh position.

Again, it can be seen in FIGS. 9 to 11 that the continuous track 50 is widened at the point of turn, creating a play for the first protrusion 36 such that the first protrusion 36 can be considered disengaged from (though still guided by) the continuous track 50.

In this area, relatively small loads are exerted on the blade axle pivot points and associated bearings. The advantage of this secondary track 62 is the ability to change the pivot action leverage point. It is advantageous to do this because the relative angle of the continuous track 50 and cam follower arm 30 can cause a snagging effect.

The interaction of the cam follower arm 30 and the second discontinuous track 62 actively controls the pivot of the vertical blade 20 in the region of the second discontinuous track 62.

As the vertical blade 20 passes through the area in the tidal flow in which the vertical blade 20 develops minimum lift, lower loads are exerted on the blade pivot axle or shaft and its associated mounting bearings. The shorter lever power of the cam follower arm 30 is sufficient to deal with these loads.

There is another benefit from using this system. Since the blade 20 can be flipped nose forward, this enables the use of a NACA profile for the blade 20 with the profile always positioned for maximum lift when required. It also enables a smooth action as the nose of the vertical blade 20 passes through the tidal flow.

The cam follower arms 30 need not be L-shaped. Other arrangements may be adopted, for example the cam follower may be formed as a plate having first and second protrusions. However, the relative location of the first and second protrusions relative to the pivot point of the vertical blade will need to be maintained.

The paths adopted by the cam follower arms 30 to control movement of each of the plurality of turbine blades 20 is determined as described below.

Each vertical blade 20 is provided with x and y coordinates about which each vertical blade 20 pivots. The analysis is performed initially in yaw increments of the whole turbine by 1 degree starting at the zero position—this is called the yaw angle ($\theta$). Note here that this angle is different from the Computational Fluid Dynamic (CFD) analysis—the relationship is $\theta=360°$−CFD Angular Position column. The X and Y coordinates of the pivot points are calculated from this $\theta$ angle, relative to the centre of the coordinate scheme, the centre of the turbine.

$$X_{pivot}=R\cos(\theta)$$

$$Y_{pivot}=R\sin(\theta)$$

Next the angle of the vertical blade 20 relative to the fixed coordinate system is calculated. The CFD analysis provides this data as an "angle of attack" compared to the local tangent. Therefore the angle of the local tangents first calculated ($\theta+90°$). The CFD angle of attack ($\alpha$) is defined as "The angle of attack of the vertical blade 20 is defined as being zero when the blade nose is oriented towards the positive clockwise direction".

This port turbine assembly rotates in the opposite direction to the one used for the CFD analysis. The negative of the CFD angle of attack is used for this analysis. For any yaw angle $\theta$ the correct angle of attack is read off a row with Ang Pos=360°−$\theta$. Therefore blade angle ($\beta$) is given by $$\beta=\theta+90°-\alpha$$

The third step is to calculate the position of the centre of the first protrusion relative to the vertical blade pivot. In this analysis, the cam follower arm may be fixed at any angle ($\gamma$) but will use a starting point of −90° which will mean that the cam follower arm lies along the positive x-axis when the turbine assembly is at 0° yaw and the angle of attack is zero (in tests the angle of attack is usually quite small at this position). The relative position is therefore $$X_{arm}=L_{arm}\cos(\beta+\gamma)$$

$$Y_{arm}=L_{arm}\sin(\beta+\gamma)$$

The coordinates of the centre of the first protrusion 36, acting as a cam follower, is given by the addition of the $X_{arm}$ and $X_{pivot}$ coordinates and similarly for the Y coordinates.

Starting at approximately 155° the CFD angle of attack recommendations require that the blade 20 rotates clockwise through an angle of approximately 90° while the yaw angle only moves through an angle of approximately 60°.

It is advantageous in this area is to smoothly accelerate the cam arm forward so that it completes this motion with minimum force. This is accomplished using the primary discontinuous track 60. The second upwardly extending protrusion 38 is adapted to enter the leading edge of the primary discontinuous track 60 and thereby rotate the blade 20 as required. The continuous track 50 is widened at the point of turn to stop the first protrusion 36 binding between the two tracks.

The secondary discontinuous track 62 is used on the other side of the turbine assembly at 30° above and below the 0° yaw angle, to ensure the blade 20 maintains the correct angle as it passes through the 0° point.

Figure 13:
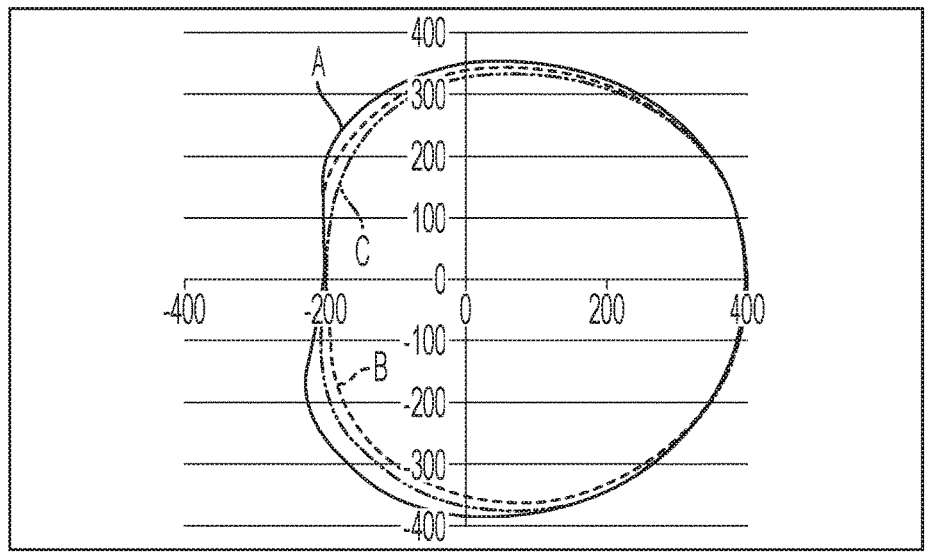
FIG. 13 shows a graph showing the relative position of a first component of the guide means during rotation at a first speed of a turbine assembly in accordance with the present invention in three tidal flows.

Using the above calculations, tracks have been calculated for three flow speeds (all at the same setting of 15 RPM) as shown in FIG. 13. FIG. 13 shows the track to be followed by the first upwardly extending protrusion for flow speeds of 1.2 m/s (A), 1.8 m/s (B) and 2.5 m/s (C). It has been determined that the maximum radial distance between the tracks is 50 mm and occurs at approximately 225° yaw angle.

Figure 14:
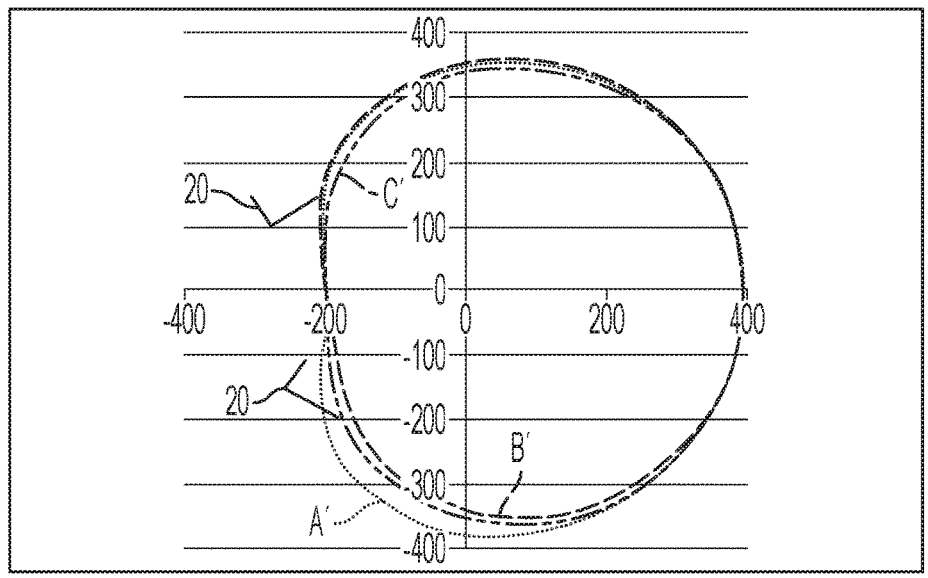
FIG. 14 shows a graph similar to that of FIG. 13 during rotation at a second speed of the turbine assembly in the same three tidal flows.

FIG. 14 shows the 20 rpm cases and the start and end positions of the cam follower for the 2.5 m/s case (similar references as for FIG. 13 are used to show each flow speed). The position of the vertical blade 20 is shown at two points on the path of the 2.5 m/s flow speed (path C')

Figure 15:
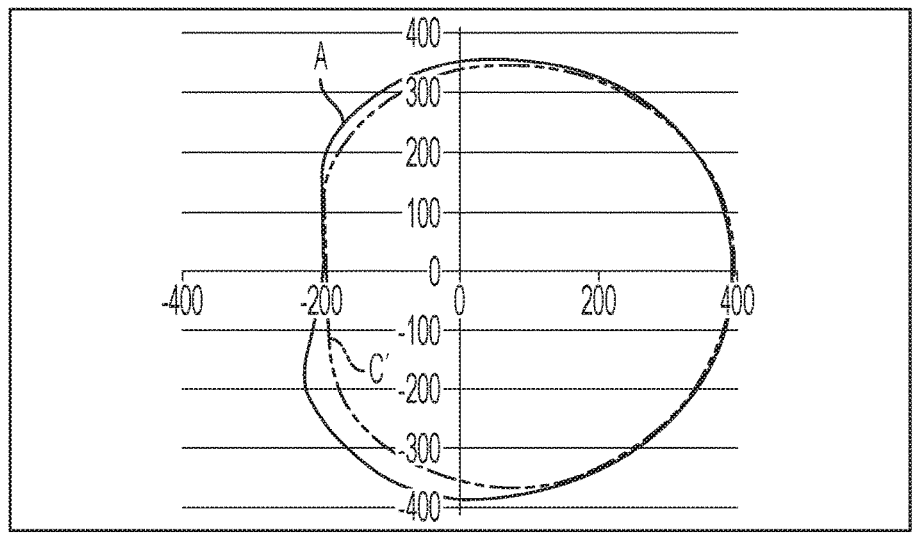
FIG. 15 shows a graph similar to that of FIGS. 13 and 14 showing only the extreme positions of the guide means component.

FIG. 15 shows just the tracks of the highest flow and rotation speed (C') and that of the lowest flow and rotation speed (A). This shows the differences in cam track position become most pronounced around the 225° yaw angle (the radial displacement here is about 44 mm).

Figure 16:
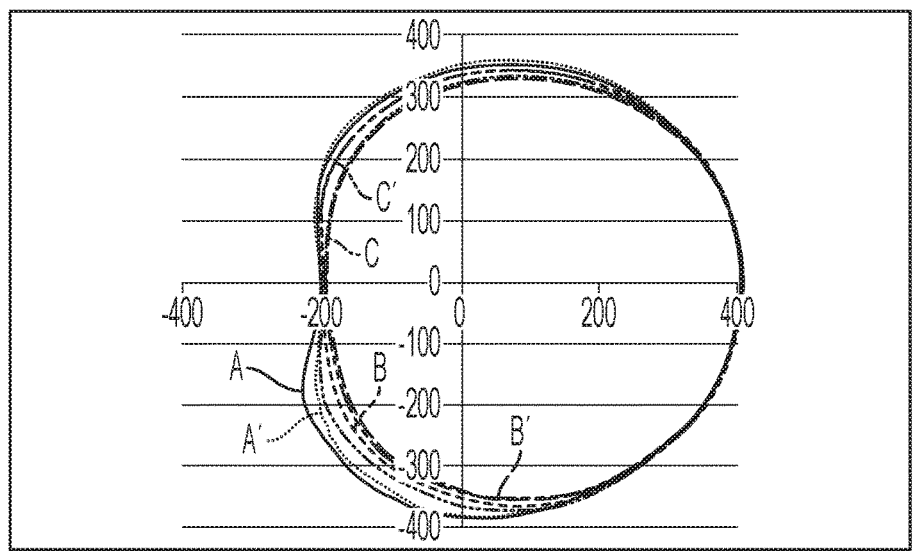
FIG. 16 shows a graph combining the all the results shown in FIGS. 13 and 14.

FIG. 16 shows all tracks for all flow speeds—1.2 m/s at 15 RPM (A), 1.8 m/s at 15 RPM (B), 2.5 m/s at 15 RPM (C), 1.2 m/s at 20 RPM (A'), 1.8 m/s at 20 RPM (B') and 2.5 m/s at 20 RPM (C'). It can be seen that some tracks are very similar.

Figure 17:
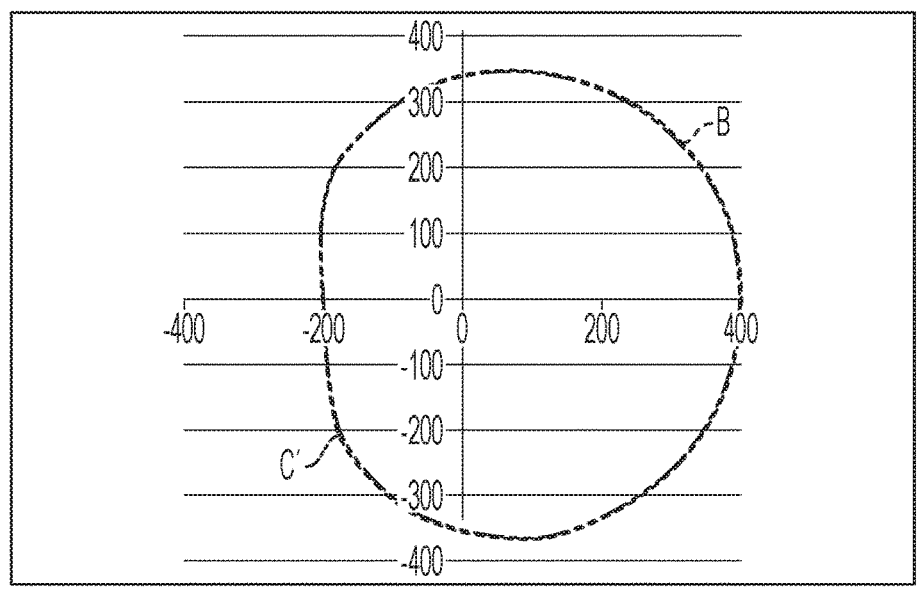
FIG. 17 shows a graph illustrating the two most similar results shown in FIGS. 13 and 14.

FIG. 17 shows the tracks with the greatest similarity, namely 1.8 m/s at 15 RPM (B) and 2.5 m/s at 20 RPM (C'). These are considered to be optimal.

A continuous track can be created using one of these tracks. Since the circular path followed by the pivot axis of the vertical blade is known, as is path that will be followed by the first protrusion in this continuous track, the shape and location of the first and second discontinuous tracks can be calculated to ensure the second protrusion will enter these tracks such that the vertical blade will be controlled to pivot or tack through the flow in the case of the first discontinuous track and to provide minimum drag in the case of the second discontinuous track.

The invention claimed is:

1. A vertical axis water turbine assembly for use in a tidal stream, the vertical axis water turbine assembly being adapted for rotation about a vertical axis and comprising:
    a plurality of vertical blades disposed about said assembly axis, each of the vertical blades having a vertical blade axis and being adapted for movement about said vertical blade axis; and
    guide means actively to control the movement of each of the plurality of vertical blades as the water turbine assembly rotates,
    wherein:
    the guide means are adapted in a first region to control the movement of each vertical blade as it passes through a first area of the tidal stream in which the vertical blade develops maximum lift;
    the guide means are also adapted in a second region to control the movement of each vertical blade as it passes through a second area of the tidal stream in which the vertical blade develops no lift;
    the guide means comprises a cam translating the rotational movement of the turbine assembly into pivoting movement of the vertical blade; and
    the cam comprises a first cam follower spaced from the axis of rotation of the vertical blade with the first cam follower being adapted to run in a first continuous track provided in or as part of an upper support and a second cam follower spaced from the axis of rotation of the vertical blade and being adapted to run in a first discontinuous track provided in or as part of the upper support in the first area of the tidal stream and in a second discontinuous track provided in or as part of the upper support in the second area of the tidal stream.

2. A vertical axis water turbine assembly according to claim 1, in which each vertical blade is controlled to flip about its vertical blade axis through the tidal stream.

3. A vertical axis water turbine assembly according to claim 1, in which each vertical blade is controlled to provide minimum drag through the tidal stream.

4. A vertical axis water turbine assembly according to claim 1, in which the water turbine assembly further comprises a lower support, each of the plurality of vertical blades being mounted on the lower support for pivoting motion with respect to the lower support.

5. A vertical axis water turbine assembly according to claim 1, in which the guide means controls the movement of each of the plurality of vertical blades cooperating with the upper support, each of the plurality of vertical blades being mounted for pivoting motion with respect to the upper support.

6. A vertical axis water turbine assembly according to claim 1, in which the guide means for each vertical blade is mounted to an upper region of the vertical blade.

7. A vertical axis water turbine assembly according to claim 1, in which in the first region the guide means cause the vertical blade to pivot to develop maximum lift.

8. A vertical axis water turbine assembly according to claim 1, in which one or more of the plurality of vertical blades is provided with a NACA profile.

9. A vertical axis water turbine assembly according to claim 1, wherein the cam is fixed in relation to said vertical blade axis.

10. A vertical axis water turbine assembly according to claim 9, wherein the first cam follower is spaced a first distance from said vertical blade axis.

11. A vertical axis water turbine assembly according to claim 10, wherein the second cam follower is spaced a second distance from said vertical blade axis.

12. A vertical axis water turbine assembly according to claim 11, wherein the first distance is greater than the second distance.

13. A vertical axis water turbine assembly according to claim 12, wherein the first distance is twice the second distance.

14. A vertical axis water turbine assembly according to claim 11, wherein the first cam follower is disposed at 90° to the second cam follower.

15. A vertical axis water turbine assembly according to claim 11, wherein the first cam follower is provided with an upwardly extending protrusion.

16. A vertical axis water turbine assembly according to claim 15, wherein the second cam follower is provided with an upwardly extending protrusion.

17. A vertical axis water turbine assembly according to claim 16, wherein the upwardly extending protrusion of the first cam follower extends further upward than the upwardly extending protrusion of the second cam follower.

18. A vertical axis water turbine assembly according to claim 16, wherein the upwardly extending protrusion of the second cam follower extends upwardly parallel to the associated vertical blade.

19. A vertical axis water turbine assembly according to claim 9, wherein the second cam follower is spaced a second distance from said vertical blade axis.

20. A vertical axis water turbine assembly for use in a tidal stream, the vertical axis water turbine assembly being adapted for rotation about a vertical axis and comprising:
    a plurality of vertical blades disposed about said assembly axis, each of the vertical blades having a vertical blade axis and being adapted for movement about said vertical blade axis; and
    a plurality of pivots mounting each of the plurality of vertical blades to the assembly, the pivots configured to control the movement of each of the plurality of vertical blades as the water turbine assembly rotates,
    wherein:
    the pivots are adapted in a first region to control the movement of each vertical blade as it passes through a first area of the tidal stream in which the vertical blade develops maximum lift;
    the pivots are also configured in a second region to control the movement of each vertical blade as each vertical blade passes through a second area of the tidal stream in which the vertical blade develops no lift;
    each of the pivots includes a cam translating the rotational movement of the turbine assembly into pivoting movement of the vertical blade; and
    each of the cams includes: a first cam follower spaced from one of the vertical blade axis, the first cam follower being configured to run in a first continuous track that is part of an upper support; and a second cam follower spaced from one of the vertical blade axis, the second cam follower being adapted to run in a first discontinuous track that is part of the upper support in the first area of the tidal stream and in a second discontinuous track provided in or as part of the upper support in the second area of the tidal stream.

\* \* \* \* \*